United States Patent
Huotari et al.

(10) Patent No.: US 9,258,408 B2
(45) Date of Patent: Feb. 9, 2016

(54) METHOD AND APPARATUS FOR THIRD-PARTY CONTROL OF DEVICE BEHAVIOR

(75) Inventors: Vesa Huotari, Tampere (FI); Ari Tourunen, Espoo (FI)

(73) Assignee: NOKIA TECHNOLOGIES OY, Espoo (FI)

(*) Notice: Subject to any disclaimer, the term of this patent is extended or adjusted under 35 U.S.C. 154(b) by 964 days.

(21) Appl. No.: 12/478,441

(22) Filed: Jun. 4, 2009

(65) Prior Publication Data

US 2010/0311336 A1     Dec. 9, 2010

(51) Int. Cl.
- *H04W 72/00* (2009.01)
- *H04M 1/725* (2006.01)
- *H04M 3/38* (2006.01)
- *H04M 3/42* (2006.01)

(52) U.S. Cl.
CPC ............ *H04M 1/72572* (2013.01); *H04M 3/38* (2013.01); *H04M 3/42348* (2013.01); *H04M 1/72577* (2013.01); *H04M 2203/053* (2013.01); *H04M 2203/2094* (2013.01); *H04M 2207/18* (2013.01); *H04M 2242/14* (2013.01); *H04M 2242/30* (2013.01); *H04M 2250/10* (2013.01)

(58) Field of Classification Search
CPC ..... H04W 4/023; H04W 12/02; H04W 12/08; H04W 4/008; H04W 4/02; H04W 88/04; H04W 4/021; H04W 52/244; H04W 52/322; H04W 52/38; H04W 74/04; H04W 52/0258; H04W 52/027; H04W 88/06; H04L 67/306; H04L 67/06; H04L 67/12; H04L 29/08108; H04L 67/42; H04L 67/10; H04L 67/18; H04L 1/1825; H04L 12/5692; H04L 1/1887; H04L 2209/80; H04L 63/029; H04M 1/7253; H04M 1/00; H04M 15/58; H04M 15/745; H04M 2215/7407; H04M 15/61; H04M 2215/2026; H04M 19/04; H04M 1/57; G06Q 30/0224; G06Q 30/0643; G06Q 30/0255; G06Q 30/0267; G06Q 30/0261; G06Q 30/0269; G06Q 30/0641; G06Q 30/0257; G06Q 30/0259
USPC .......... 455/41.3, 456.1, 466; 705/26.1, 26.35, 705/26.4, 14.58
See application file for complete search history.

(56) References Cited

U.S. PATENT DOCUMENTS

| | | | |
|---|---|---|---|
| 6,085,096 A | 7/2000 | Nakamura | |
| 7,133,685 B2 | 11/2006 | Hose et al. | |
| 7,269,414 B2 | 9/2007 | Patzer et al. | |
| 2002/0120512 A1* | 8/2002 | McKinley et al. | 705/14 |
| 2002/0174025 A1* | 11/2002 | Hind et al. | 705/26 |
| 2003/0078080 A1* | 4/2003 | Miriyala | 455/567 |
| 2005/0030384 A1 | 2/2005 | Lee et al. | |
| 2006/0019645 A1* | 1/2006 | Azimi et al. | 455/419 |
| 2008/0114862 A1* | 5/2008 | Moghaddam et al. | 709/220 |

(Continued)

FOREIGN PATENT DOCUMENTS

| | | |
|---|---|---|
| EP | 1 761 093 A1 | 3/2007 |
| JP | 2002-135838 A | 5/2002 |

*Primary Examiner* — Nimesh Patel
(74) *Attorney, Agent, or Firm* — Ditthavong & Steiner, P.C.

(57) ABSTRACT

An approach is provided for enabling third-parties to manage a mobile device when within a third party's domain range. Data regarding a point-of-interest and an associated action by a mobile device is received. The action is defined by a third-party. Whether the mobile device is within a predetermined range of the point-of-interest is detected. The action is invoked if the mobile device is within the predetermined range.

20 Claims, 9 Drawing Sheets

(56) References Cited

U.S. PATENT DOCUMENTS

| | | |
|---|---|---|
| 2008/0126334 A1 | 5/2008 | Laine et al. |
| 2008/0154714 A1* | 6/2008 | Liu et al. .................... 705/14 |
| 2008/0299989 A1 | 12/2008 | King et al. |
| 2009/0047972 A1 | 2/2009 | Neeraj |
| 2009/0325566 A1* | 12/2009 | Bell et al. .................... 455/419 |

* cited by examiner

METHOD AND APPARATUS FOR THIRD-PARTY CONTROL OF DEVICE BEHAVIOR

BACKGROUND

Wireless (e.g., cellular) service providers and device manufacturers are continually challenged to deliver value and convenience to consumers by, for example, providing compelling network services, applications, and content, as well as user-friendly devices. Important differentiators in the industry are application and network services as well as the convenience and security of using the application and network services. The ubiquity of mobile phones has garnered some negative attention, in that operation of these devices within certain areas is prohibited, or simply be considered improper etiquette. For example, hospitals and airplanes have place restrictions on cell phone use. Also, patrons in fine dining establishments are requested not to operate their phones out of courtesy to others. The users of these devices are on their honor to follow the restrictions place upon them by the operator or owner of the premises; nevertheless, total compliance is difficult. Traditionally, the control of mobile devices has been limited to the mobile users themselves.

SOME EXAMPLE EMBODIMENTS

Therefore, there is a need for an approach for securely controlling user equipments by third-parties.

According to one embodiment, a method comprises receiving data regarding a point-of-interest and an associated action by a mobile device, wherein the action is defined by a third-party. The method also comprises detecting whether the mobile device is within a predetermined range of the point-of-interest. The method further comprises invoking the action if the mobile device is within the predetermined range.

According to another embodiment, an apparatus comprising at least one processor, and at least one memory including computer program code, the at least one memory and the computer program code configured to, with the at least one processor, cause the apparatus to receive data regarding a point-of-interest and an associated action by a mobile device, wherein the action is defined by a third-party. The apparatus is also caused to detect whether the mobile device is within a predetermined range of the point-of-interest. The apparatus is further caused to invoke the action if the mobile device is within the predetermined range.

According to another embodiment, a computer-readable storage medium carrying one or more sequences of one or more instructions which, when executed by one or more processors, cause an apparatus to receive data regarding a point-of-interest and an associated action by a mobile device, wherein the action is defined by a third-party. The apparatus is also caused to detect whether the mobile device is within a predetermined range of the point-of-interest. The apparatus is further caused to invoke the action if the mobile device is within the predetermined range.

According to another embodiment, an apparatus comprises means for receiving data regarding a point-of-interest and an associated action by a mobile device, wherein the action is defined by a third-party. The apparatus also comprises means for detecting whether the mobile device is within a predetermined range of the point-of-interest. The apparatus further comprises means for invoking the action if the mobile device is within the predetermined range.

According to one embodiment, a method comprises storing information about a plurality of points-of-interests and respective actions that are performed by a mobile device when the mobile device is within a predetermined range of the respective points-of-interest. The method also comprises initiating transmission of the information to one or more of the mobile devices.

According to another embodiment, an apparatus comprising at least one processor, and at least one memory including computer program code, the at least one memory and the computer program code configured to, with the at least one processor, cause the apparatus to store information about a plurality of points-of-interests and respective actions that are performed by a mobile device when the mobile device is within a predetermined range of the respective points-of-interest. The apparatus is also caused to initiate transmission of the information to one or more of the mobile devices.

According to another embodiment, a computer-readable storage medium carrying one or more sequences of one or more instructions which, when executed by one or more processors, cause an apparatus to store information about a plurality of points-of-interests and respective actions that are performed by a mobile device when the mobile device is within a predetermined range of the respective points-of-interest. The apparatus is also caused to initiate transmission of the information to one or more of the mobile devices.

According to another embodiment, an apparatus comprises means for storing information about a plurality of points-of-interests and respective actions that are performed by a mobile device when the mobile device is within a predetermined range of the respective points-of-interest. The apparatus also comprises means for initiating transmission of the information to one or more of the mobile devices.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF PREFERRED EMBODIMENT

A method and apparatus for enabling third-party control of a user equipment are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to mobile devices, it is contemplated that the approach described herein may be used with other devices and applications.

Figure 1:
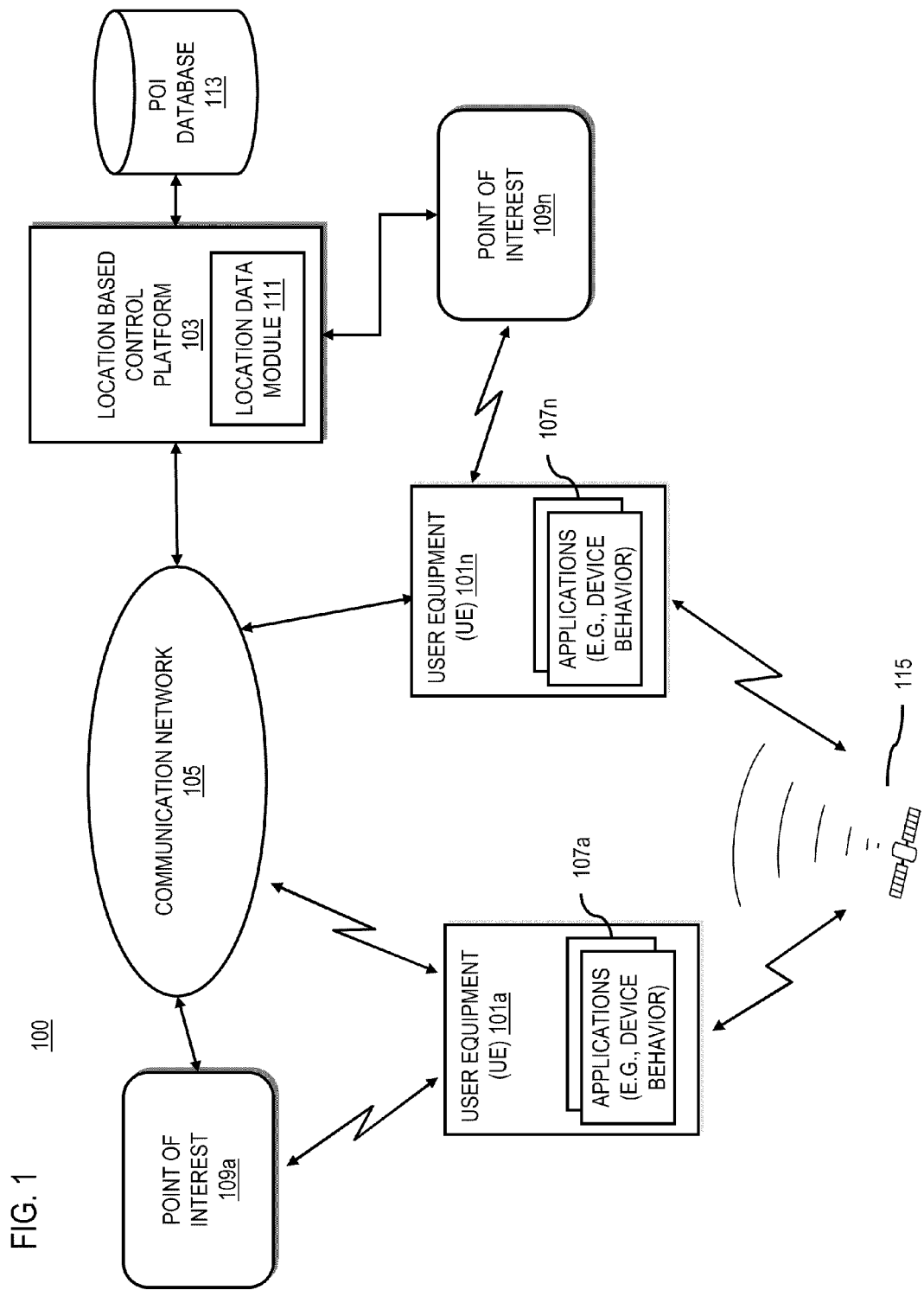
FIG. 1 is a diagram of a system capable of enabling third-party control of a user equipment, according to one embodiment.

FIG. 1 is a diagram of a system capable of enabling third-party control of a user equipment, according to one embodiment. In a mobile world, increasing services and applications are being offered to users. As indicated, such services can be inappropriate in certain locations and/or situations. It recognition of this, system 100 is configured to provide services that include management of user devices while within the range of a third-party. In other words, the system 100 permits third-parties to manage the use of mobile devices within their borders or premises. There are also situations in which it would be beneficial for a mobile device owner to allow third-parties to impact the manner in which the owner's mobile device behaves. However, it is difficult to securely allow a third-party to control a user device within the third-party's domain. A domain can be an area surrounding a point-of-interest (POI) in which the third-party can request to control user devices.

To address this problem, system 100 of FIG. 1 introduces the capability to securely allow management of a user equipment (UE) 101. The UE 101 is any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.). The UE 101 can be used by a user to communicate with a location-based control platform 103 via a communication network 105. The UE 101 may use an application 107, such as a device behavior application 107a-107n, to support secure third-party management. A third-party corresponding to POIs 109a-109n can be enabled by the application 109 to control UEs 101a-101n when a UE 101 is within the POI's domain. A location data module 111 can be used in conjunction with a POI database 113 to enable the third-party management of POIs. For example, the location data module 111 can be populated by information received from the UE 101. Additionally, the ULE 101 can use a tracking mechanism, such as a global positioning system (GPS) using GPS satellites 115, an Assisted GPS (A-GPS), a cell of origin system, or other location tracking systems to track the UE 101's position.

According to one embodiment, a user of a UE 101 registers with a service provider to provide location-based control services. The user can register by sending user information, tying the UE 101 to an account for the location-based control services. In one embodiment, once the account is created, the user is able to set a level of security for what types of third-parties the user trusts with control. For example, the user can subscribe to a service where the UE 101 will allow a third-party to change its profile settings to a silent mode when entering the domain of the third-party (e.g., a hospital or a movie theatre).

In one embodiment, categories of POIs 109 can be selected by a user as trusted. POI 109 locations in the category can then be mapped onto a POI database 113 and profile settings could be changed when the UE 101 enters a POI's 109 domain. POIs 109 can also register with the service provider to customize areas inside of the POI's 109 domain. For instance, a POI 109 can send a signal to UEs 101 to remain on silent mode while in some areas of the POI 109 domain, but not in other areas. The signal may carry identification for the POI 109 and an associated action to be carried out. Once the signal is received by the UE 101, the UE 101 can authenticate the signal's identification information with a location based control platform 103 to determine whether the signal is trustworthy. If the signal is determined to be trustworthy, the UE 101 performs the action.

In one embodiment, hospitals or other emergency POIs, movie theatres, landmarks, or advertising locations can be POI 109 categories. In other embodiments, the POIs 109 need not be categorized and can be individual locations such as specific restaurants or unique locations. In some embodiments, actions associated with the POIs 109 can include POI 109 instructions to control profiles (e.g., a silent mode), entertain (e.g., trivia about the area or a theme mode associated with a POI 109), inform (e.g., background images and historical information about a landmark), or advertise (e.g., a restaurant's specials can be downloaded to a UE 101 when the UE 101 is within the restaurant's domain).

By way of example, the communication network 105 of system 100 includes one or more networks such as a data network (not shown), a wireless network (not shown), a telephony network (not shown), or any combination thereof It is contemplated that the data network may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, mobile ad-hoc network (MANET), and the like.

In this example, the UE 101, location based control platform 103, and POIs 109 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
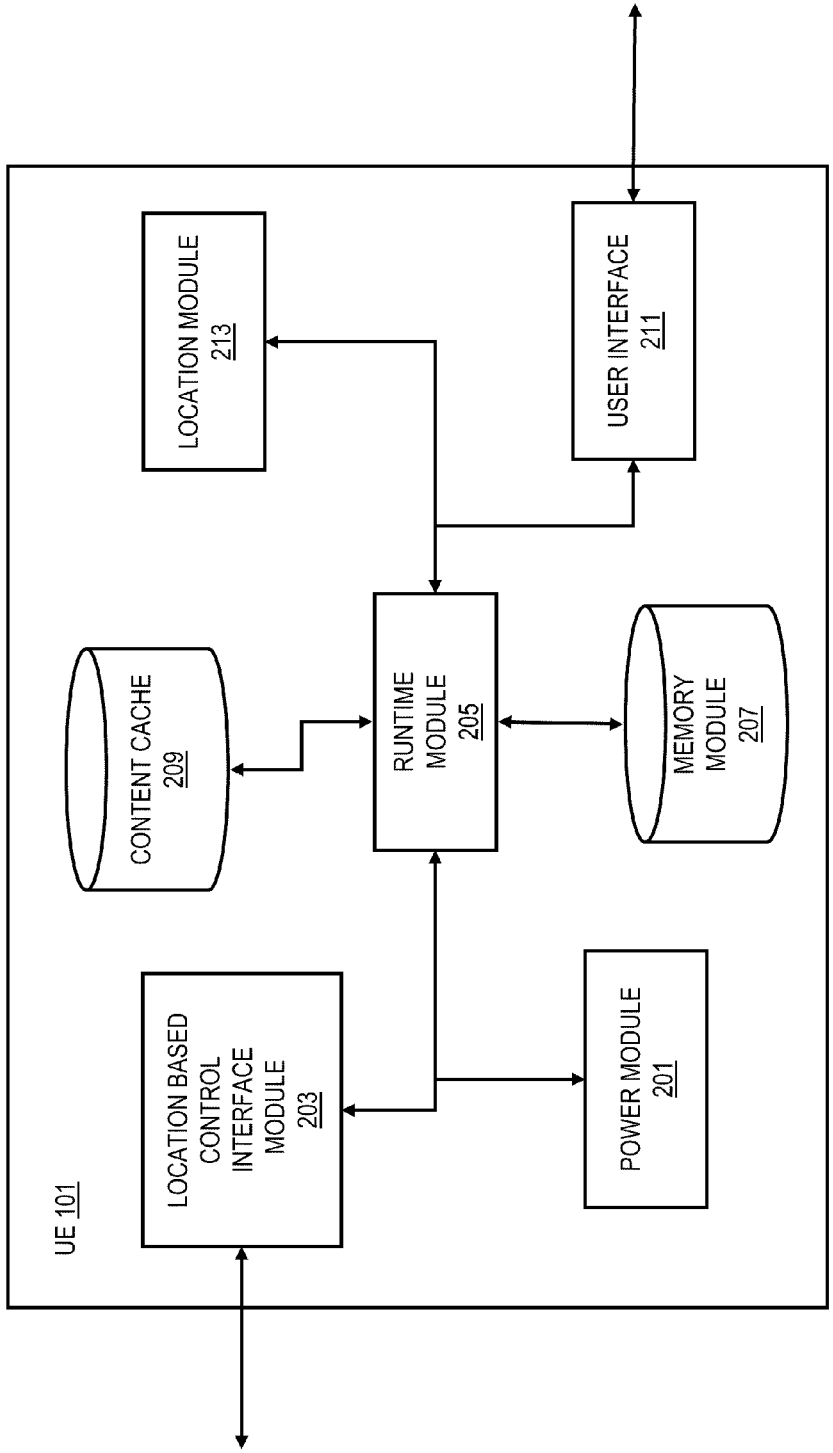
FIG. 2 is a diagram of the components of a user equipment, according to one embodiment.

FIG. 2 is a diagram of the components of a ULE 101, according to one embodiment. By way of example, the UE 101 includes one or more components for securely enabling third-party control of the UE 101. It is contemplated that the functions of these components may be combined in one or more components or performed by other components of equivalent functionality. In this embodiment, the UE 101 includes a power module 201, a location based control interface module 203, a runtime module 205, a memory module 207, a content cache 209, a user interface 211, and a location module 213.

The power module 201 provides power to the UE 101. The power module 201 can include any type of power source (e.g., battery, plug-in, etc.). Additionally, the power module can provide power to the components of the UE 101 including processors, memory, and transmitters.

In one embodiment, the UE 101 includes a location based control interface module 203. The location based control interface module 203 is used by a runtime module 205 to request and receive services from a location based control platform 103. These services can include POI 109 trustworthiness, POI 109 action information, and POI 109 content information. Additionally, these services can include third-party POI 109 control actions. For example, a third-party POI 109 can send data to the UE 101 via the interface module 203. The interface module 203 can use multiple communications technologies to communicate with a POI 109. For instance, the interface module 203 can interface with the POI 109 using a wireless LAN (WLAN) interface while interfacing with a location based control platform 103 via a cellular network. In this manner, data can be transported to the UE 101 with little cost to a cellular provider. In an alternative embodiment, the information regarding POIs 109 and POI 109 actions can come directly via a cellular connection to the location based control platform 103. In this embodiment, the actions can be stored in a content cache 209 until the action is invoked by reaching the range of a POI 109 domain.

In one embodiment, the UE 101 includes a location module 213. This location module 213 can determine a user's location. The user's location can be determined by a triangulation system such as GPS, A-GPS, Cell of Origin, or other location extrapolation technologies, as well as proximity location indicators, such as a signal from a wireless local area network (WLAN), a Bluetooth® system, or the like. Standard GPS and A-GPS systems can use satellites to pinpoint the location of a UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 213 may also utilize multiple technologies to detect the location of the ULE 101. For instance, a GPS system may narrow the location of the UE 101 to a building and a WLAN signal can determine UE 101 locations within the building. In one embodiment, the position of the UE 101 can be determined by detecting WLAN access point availability. In another embodiment, a cellular network base station may define a position of a UE 101 to trigger a POI 109 query. This embodiment provides a low-power method for gathering index information about nearby POIs 109. In yet another embodiment, a POI 109 can be defined as a proximity of a WLAN access point, thus providing a location (e.g., near POI 109) to the UE 101. In this embodiment, the direct availability of the WLAN access point can trigger a POI 109 query.

In one embodiment, the UE 101 includes a runtime module 205 that can process a user's requests via a user interface 211 and run device behavior applications 107. A device behavior application 107 can be run in the background of a UE 101 system. In this manner, a user of the UE 101 is can conveniently and effortlessly receive the third-party management information.

In one embodiment, when the device behavior application 107 is activated, the runtime module 205 can determine the location of UE 101 using a location module 213. In this embodiment, POI 109 action information is cached on a location based control platform 103 to send to the UE 101 when the UE 201 is within the POI 109 domain range. The runtime module 205 can send the location information to the location based control platform 103 via a location based control interface module 203. The location based control platform's location data module 111 can store the location and check a POI database 113 to determine if POIs 109 are near the UE 101. If there is a POI 109 nearby, the location based control platform 103 sends an index of nearby POIs 109 to the UE 101. In one embodiment, the POI 109 index is refreshed when the UE 101 reaches a neighborhood. A neighborhood can be a network cell or a geographical division. A neighborhood index updating at a new network cell can save battery life because a UE 101 need not process additional information to determine which network cell the UE 101 is within. The UE 101 runtime module 205 receives the index and stores the information in a content cache. The location based control platform 103 can also send information regarding actions associated with the POI 109 either at the time of indexing or when the UE 101 reaches the POI's domain. In another embodiment, POI 109 information and associated actions are pre-stored in the content cache 209 and updated periodically by a location based control platform 103. As a UE 101 approaches a POI 109, the UE 101 recognizes the POI 109 and the action associated with the location. The UE 101 then performs the action associated with the POI 109. In this embodiment, the UE 101 can process the associated action, and need not contact a location based control platform 103.

In another embodiment, a runtime module 205 can receive action information from a POI 109. In this embodiment, the POI 109 can broadcast or send a signal 109 to UEs 101 to notify a UE 109 that the UE 101 is nearby or within the domain of the POI 109. The runtime module 205 receives the POI 109 signal and processes the signal's information. The signal can include POI 109 identification information as well as POI 109 action information. In one embodiment, the signal includes a wakeup interrupt to wakeup a device behavior application 107 residing on the UE 101. The runtime module 205 processes the signal and activates the device behavior application 107 via a watchdog application. The runtime module 205 then contacts a location based control platform 103 to verify that the POI 109 signal is valid and secure. Once the POI 109 is verified as safe, the POI 109 action is executed. In one embodiment, POI 109 action content is downloaded directly from the POI 109 via a communication network. In another embodiment, POI 109 action content is downloaded from the location based control platform 103.

Figure 3:
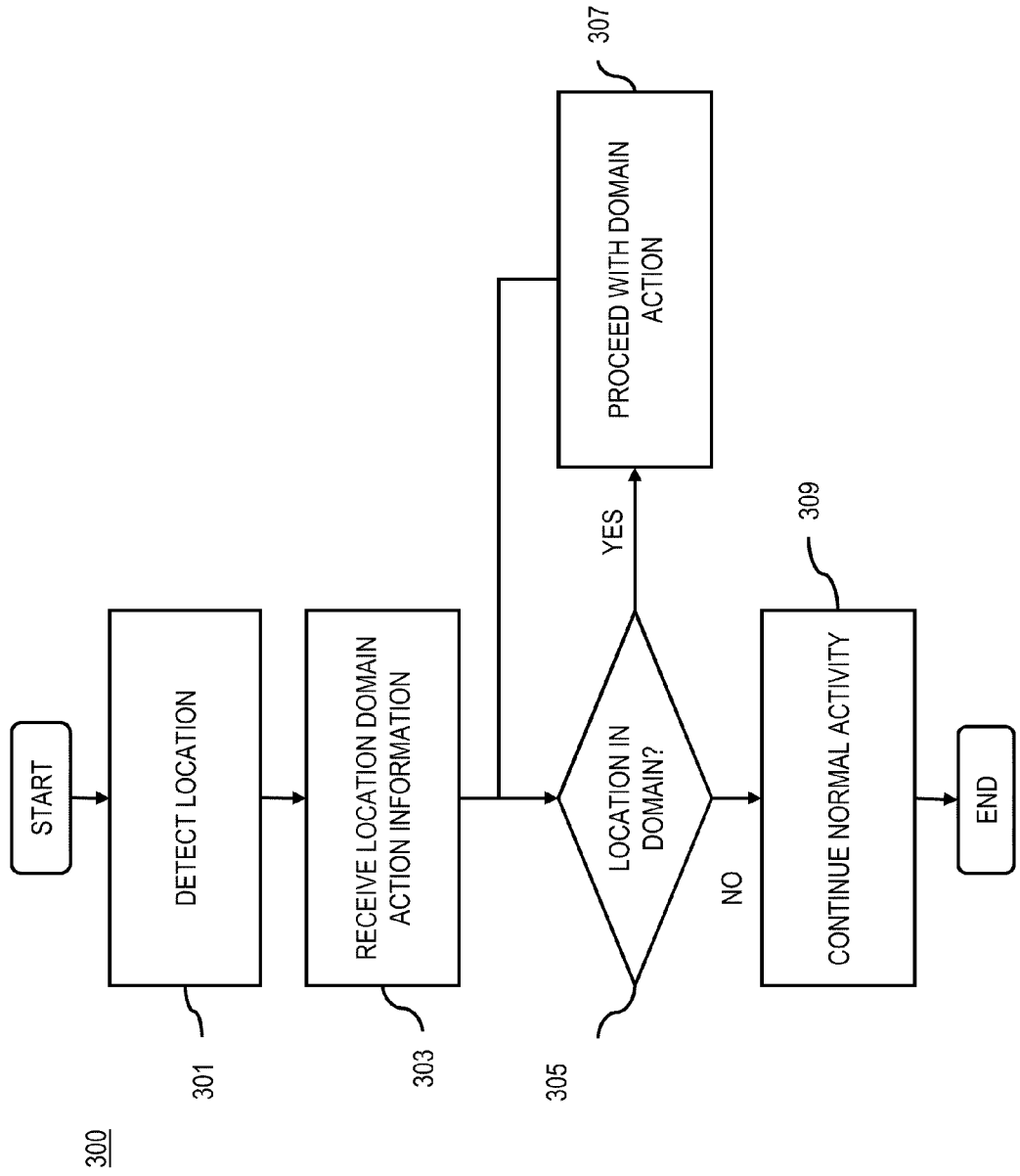
FIG. 3 is a flowchart of a process for enabling third-party control of a user equipment, according to one embodiment.

FIG. 3 is a flowchart of a process for enabling third-party control of a ULE 101, according to one embodiment. In one embodiment, the runtime module 205 performs the process 300 and is implemented in, for instance, a chip set including a processor and a memory as shown FIG. 8. A user running a device behavior application 107 on a UE 101 can detect the UE's location as a background application. The location can be detected by a location position technology (e.g., GPS), via a signal informing the UE 101 of its location, or the like. At step 301, the location of the UE 101 is detected. The UE 101 runtime module 205 then requests POI 109 information surrounding the UE's 101 location. At step 303, when the UE 101 is nearby the range of a POI's 109 domain, the UE 101 receives POI 109 action information from a service associated with the POI 109 or via a location based control platform 103. The POI can set the rules for the associated action to be executed. In one embodiment, if action information is received from a third-party source, the action information can be authenticated with the location based control platform 103. At step 305, the ULE 101 monitor's its location to determine if it is within the range of the POI's 109 domain.

If the UE's 101 location is within the domain of the POI 109, at step 307, the UE 101 follows the POI's 109 action. In some embodiments, the user is allowed to set preferences to consider the actions as suggestions, thus the user can allow only certain suggestions to be completed. For example, the user can allow categories of actions to be completed (e.g., allowing a hospital to control the UE 101's profile), while not allowing other categories of actions to be completed (e.g., advertisements). The UE 101 continues to monitor the location of the UE 101 to determine if the UE 101 is within the domain of the POI 109. If the UE 101 is leaves the range of the POI 109 or does not enter, at step 309, the UE 101 continues normal activity.

With the above approach, users can securely and conveniently allow a third-party to control a UE 101. In this manner, the UE 101 can be controlled by a third-party by receiving and invoking action information. For example, this approach allows a category of POIs 109 to invoke actions (e.g., silencing UEs 101) on a UE 101 when the UE is within the territory of the POI 109.

Figure 4B:
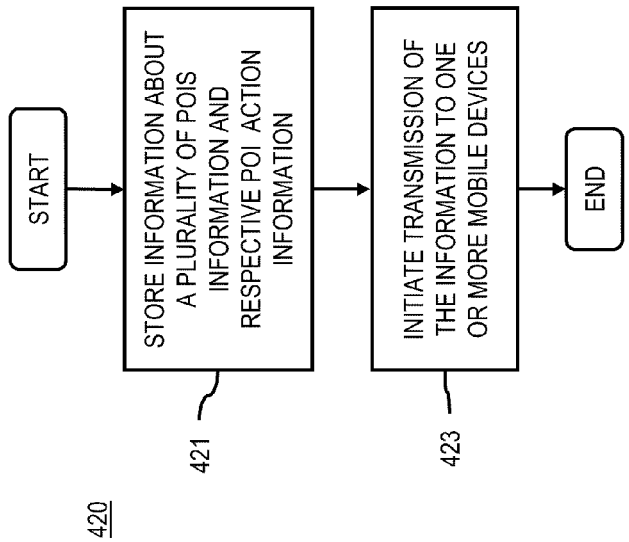
FIG. 4B is a flowchart of a service provider process for enabling third-party control of a user equipment, according to one embodiment.
Figure 4A:
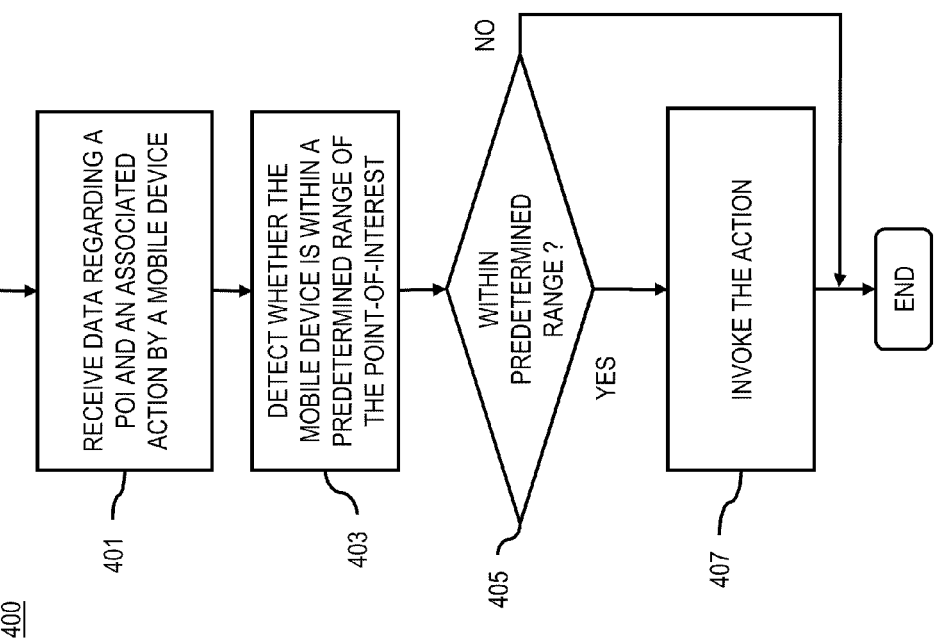
FIG. 4A is a flowchart of a client process for enabling third-party control of a user equipment, according to one embodiment.

FIG. 4A is a flowchart of a client process for enabling third-party control of a user equipment, according to one embodiment. In one embodiment, a runtime module 205 performs the process 400 and is implemented in, for instance, a chip set including a processor and a memory as shown FIG. 8. A user running a device behavior application 107 on a UE 101, such as a mobile device, monitors its location using a location module 213. At step 401, the mobile device receives data regarding a point-of-interest and an associated action. The associated action is defined by a third-party. In one embodiment, the third-party is an entity associated with the POI 109, such as an owner, a non-profit organization, or another interested party.

At step 403, the mobile device detects whether it is within a predetermined range of a POI 109. The predetermined range, or a POI domain, can be a range in which the third-party requests control of the mobile device. Examples of a predetermined range include the area surrounding a hospital or a landmark. At step 405, the mobile device determines whether it is within the predetermined range. If the mobile device is within the predetermined range of the POI 109, at step 407, the associated action is invoked.

FIG. 4B is a flowchart of a third-party process for enabling third-party control of a UE 101, according to one embodiment. In one embodiment, the location based control platform 103 performs the process 420 and is implemented in, for instance, a chip set including a processor and a memory as shown FIG. 8. At step 421, a location based control platform 103 stores information about a plurality of POIs and actions respectively associated with each of the POIs 109. The actions are to be performed by a mobile device when the mobile device is within a predetermined range of the respective points-of-interest 109. At step 423, the location based control platform 103 initiates a transmission of the stored information to one or more of the mobile devices. These transmissions can be sent in increments. For example, a POI index is sent to the mobile device when in an first area, and action information is sent when within the predetermined range of one of the POIs 109. In one embodiment, the transmission includes a generated control message. The control message can indicate invoking one of the actions by the mobile device when within the predetermined range of one of the POIs 109.

With the above approach, a third-party can securely control a UE 101. In this manner, a third-party can control a UE 101 by storing and sending action information. Thus, this approach allows a third-party to set rules that a UE 101 follows while at a certain location.

Figure 5B:
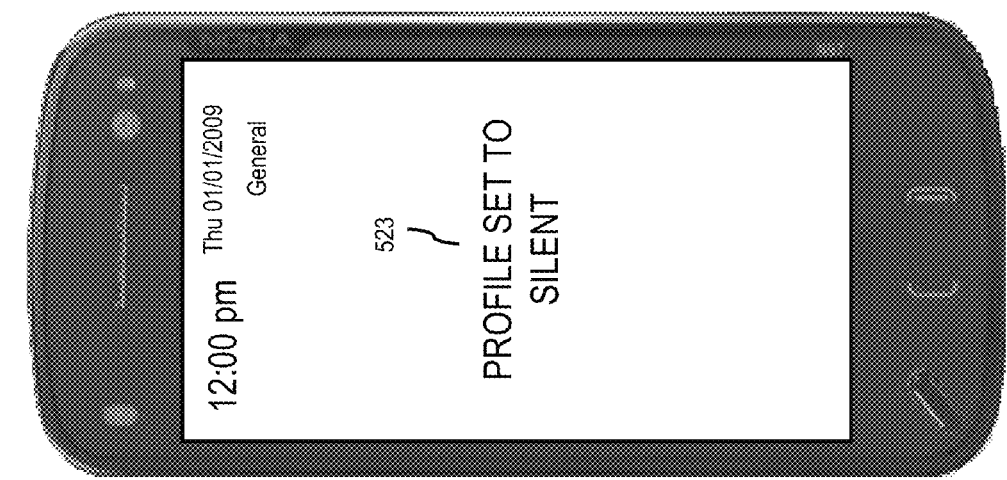
FIG. 5B is a diagram of a user interface utilized in FIG. 5A, according to one embodiment.
Figure 5A:
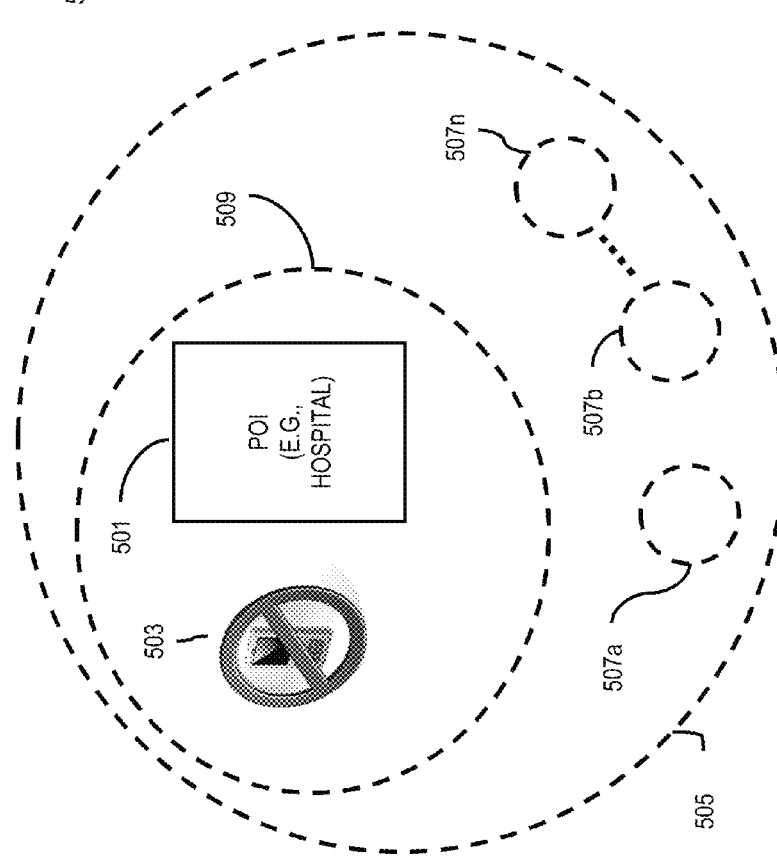
FIG. 5A is a diagram of points-of-interest including a hospital domain, according to one embodiment.

FIG. 5A is a diagram of points-of-interest including a hospital domain and FIG. 5B is a diagram of a user interface utilized in the domain of FIG. 5A, according to one embodiment. In this embodiment, a third party (e.g., hospital) can control UE 101 settings (e.g., volume, certain functions, network connectivity, etc.). In one embodiment, a hospital 501 is a POI 109 associated with an action to silence mobile devices 503 entering its domain. When entering a predetermined area 505, a mobile device 521 receives a POI 109 update indicating that the hospital 501 and POIs 507a-507n are within the predetermined area. The mobile device 521 can poll a location based control platform 103 when leaving one area or entering another to receive the update. The mobile device 521 enters a predetermined domain range 509 of the hospital 501. When entering the domain 509, the mobile device 521, is set to a silent profile 523. When the mobile device 521 leaves the domain 509, the mobile device 521 returns to its normal profile. Other actions can be performed based on the POI 507. In some embodiments, connectivity features can be controlled, for example network features such as internet or games can be shut off in locations where it is forbidden to have them activated (e.g., a school). In one embodiment, a restaurant POI 507a can control an action to send the mobile device 521 an advertisement. In this embodiment, the advertisement can include media content through applications (e.g., flash media, rich media content, Java midlets). In another embodiment, a POI 507b can control an action to send a presentation relating to the POI 507 to the mobile device 521.

Figure 6:
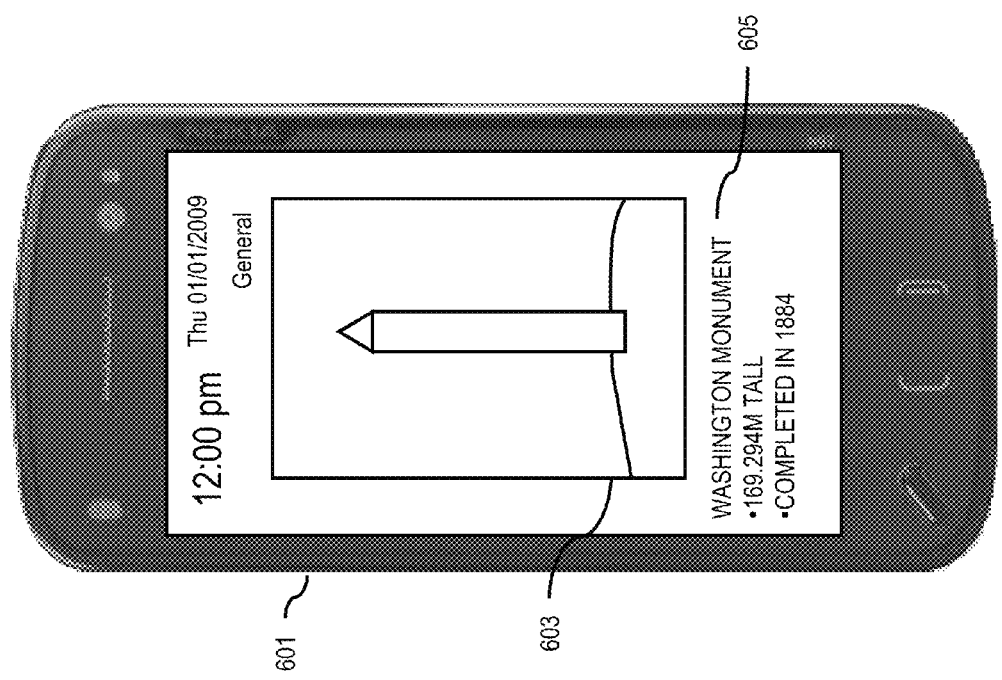
FIG. 6 is a diagram of a user interface utilized in the processes of FIG. 3, according to one embodiment.

FIG. 6 is a diagram of a user interface 601 utilized in the process of FIG. 3, according to one embodiment. The user interface 601 displays content 603 associated with a landmark point-of-interest. In this embodiment, the landmark point-of-interest displays an image of the landmark 603 as well as landmark information 605 (e.g., name of landmark, historical information, etc.). The landmark image 603 can be displayed as a new home screen on the user interface. In another embodiment, the landmark image 603 can be displayed as taking a portion of the user interface 601 screen. In another embodiment, sound associated with the landmark can be played. Thus, in one embodiment, the landmark image 603 can be displayed as a background wallpaper while the user uses the user interface 601 for other operations.

The processes described herein for providing third-party management of a device may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
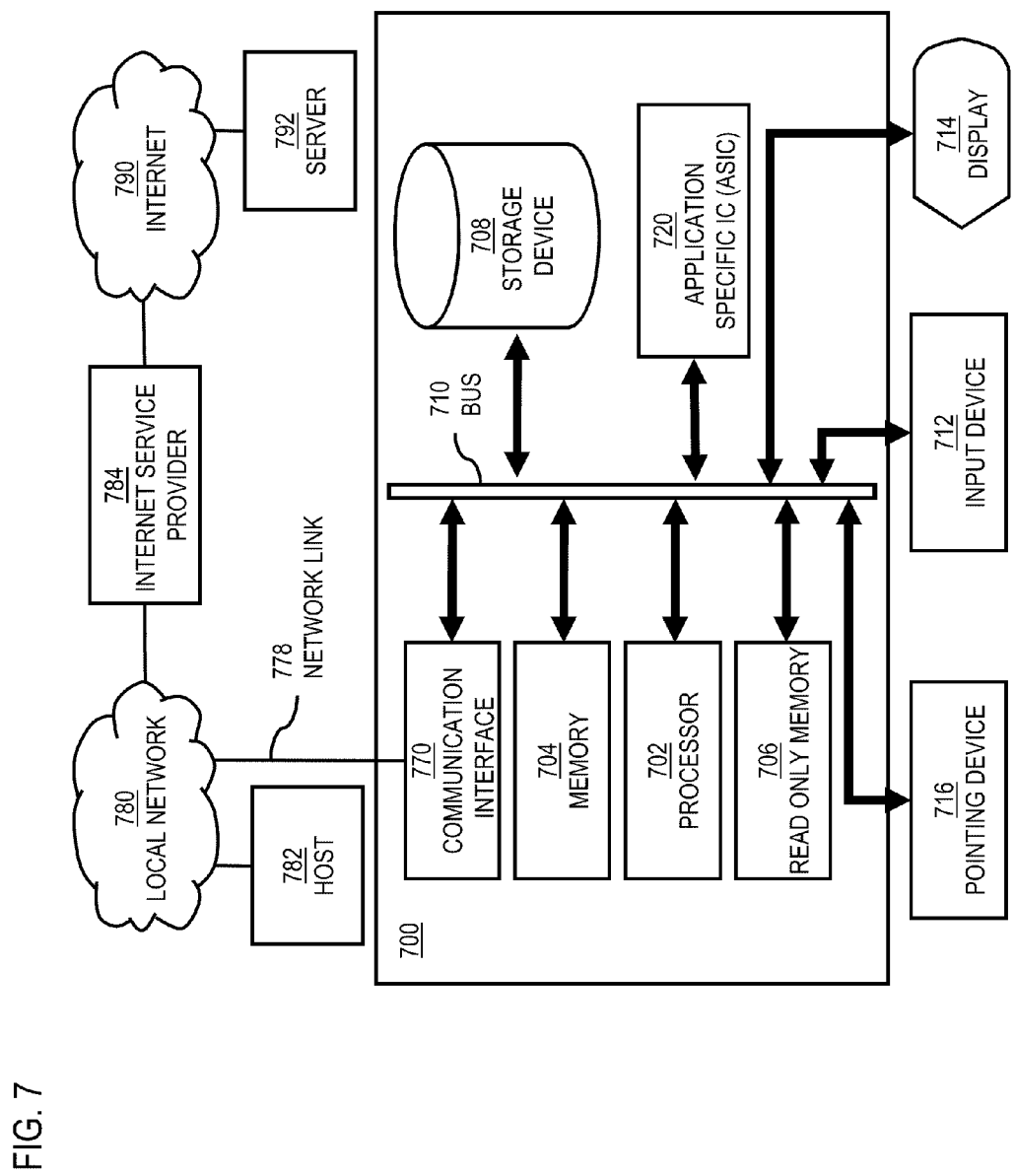
FIG. 7 is a diagram of hardware that can be used to implement an embodiment of the invention.

FIG. 7 illustrates a computer system 700 upon which an embodiment of the invention may be implemented. Computer system 700 is programmed (e.g., via computer program code or instructions) to provide third-party management of a device as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 710 includes one or more parallel conductors of information so that information is transferred quickly among devices coupled to the bus 710. One or more processors 702 for processing information are coupled with the bus 710.

A processor 702 performs a set of operations on information as specified by computer program code related to third-party management of a device. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for third-party management of a device. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for third-party management of a device, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for third-party management of a UE 101.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Figure 8:
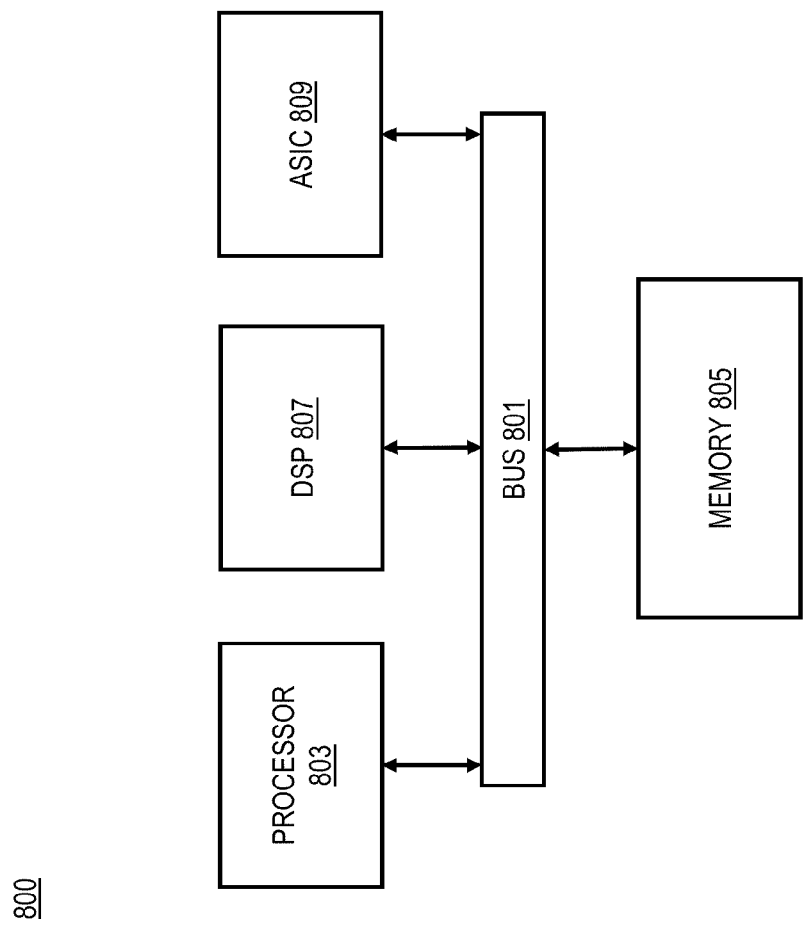
FIG. 8 is a diagram of a chip set that can be used to implement an embodiment of the invention.

FIG. 8 illustrates a chip set 800 upon which an embodiment of the invention may be implemented. Chip set 800 is programmed to provide third-party management of a device as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide third-party management of a device. The memory 805 also stores the data associated with or generated by the execution of the inventive steps.

Figure 9:
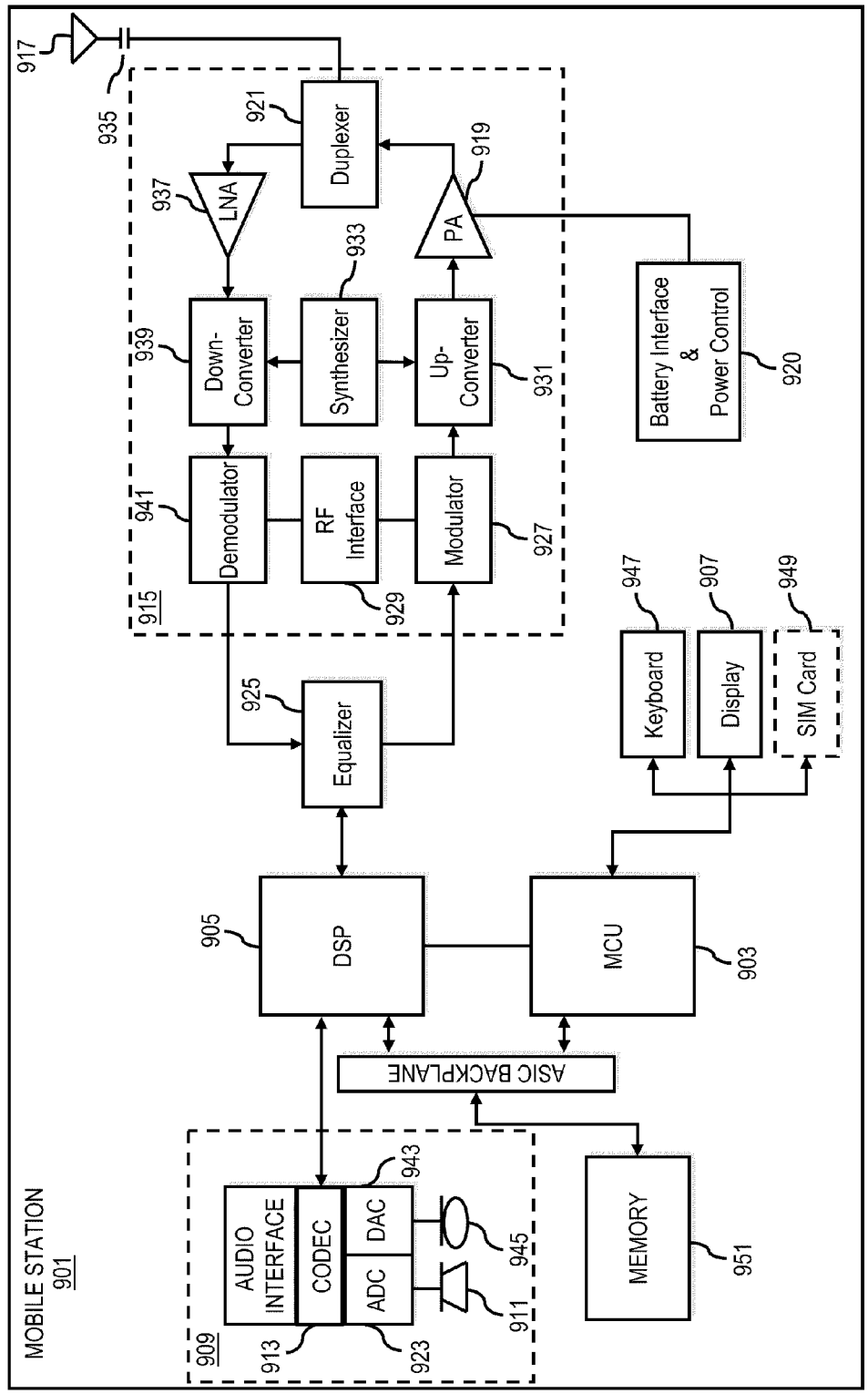
FIG. 9 is a diagram of a mobile station (e.g., handset) that can be used to implement an embodiment of the invention.

FIG. 9 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile station functions that offer automatic contact matching. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile station 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile station 901 to provide third-party management of a device. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the station. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile station 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile station 901 on a radio network. The card 949 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
receiving an index of one or more points-of-interest based on a determined location from the control platform, by a mobile device employing a device behavior application, wherein the received index includes point-of-interest data and associated action and wherein the action is defined by a third-party;
detecting whether the mobile device is within a predetermined range of the point-of-interest; and
invoking the action if the mobile device is within the predetermined range,
wherein the detection of whether the mobile device is within the predetermined range of the point-of-interest is based, at least in part, on the index.

2. A method of claim 1, further comprising:
receiving an interrupt signal from the point-of-interest when the mobile device is within the predetermined range, the interrupt signal indicating the action; and
permitting the point-of-interest control to control invocation of the action when the mobile device is within the predetermined range.

3. A method of claim 1, wherein the associated action comprises modifying a profile of the mobile device, the profile specifying a silent mode of notification, a new home screen, or execution of an application.

4. A method of claim 1, wherein the associated action comprises receiving a presentation relating to the point-of-interest, receiving an advertisement relating to the point-of-interest, or a combination thereof.

5. A method of claim 1, further comprising:
causing, at least in part, caching of the received point-of-interest data and the associated action data;
designating one or more categories of points-of-interest as trusted;
determining that the cached point-of-interest data is associated with one of the categories; and authenticating the point-of-interest based on the determination.

6. A method of claim 1, further comprising:
determining a location of the mobile device; and
determining to transmit the location to a control platform.

7. A method of claim 6, wherein the transmission of the location is based, at least in part, on a detection that the mobile device has changed network cells.

8. An apparatus comprising:
at least one processor; and
at least one memory including computer program code for one or more programs,
the at least one memory and the computer program code configured to, with the at least one processor, cause the apparatus to perform at least the following,
receive an index of one or more points-of-interest based on a determined location from the control platform, wherein the received index includes point-of-interest data and associated action, by a mobile device employing a device behavior application, wherein the action is defined by a third-party,
detect whether the mobile device is within a predetermined range of the point-of-interest, and
invoke the action if the mobile device is within the predetermined range,
wherein the detection of whether the mobile device is within the predetermined range of the point-of-interest is based, at least in part, on the index.

9. An apparatus of claim 8, wherein the apparatus is further caused to:
receive an interrupt signal from the point-of-interest when the mobile device is within the predetermined range, the interrupt signal indicating the action; and
permit the point-of-interest control to control invocation of the action when the mobile device is within the predetermined range.

10. An apparatus of claim 8, wherein the associated action comprises causing the apparatus to modify a profile of the mobile device, the profile specifying a silent mode of notification, a new home screen, or execution of an application.

11. An apparatus of claim 8, the associated action comprises receiving a presentation relating to the point-of-interest, receiving an advertisement relating to the point-of-interest, or a combination thereof.

12. An apparatus of claim 8, wherein the apparatus is further caused to:
cause, at least in part, caching of the received point-of-interest data and the associated action data;
designate one or more categories of points-of-interest as trusted;
determine that the cached point-of-interest data is associated with one of the categories; and
authenticate the point-of-interest based on the determination.

13. An apparatus of claim 8, wherein the apparatus is further caused to:
determine a location of the mobile device; and
determine to transmit the location to a control platform.

14. An apparatus of claim 13, wherein the the transmission of the location is based, at least in part, on a detection that the mobile device has changed network cells.

15. A method comprising facilitating access to at least one interface configured to allow access to at least one service, the at least one service configured to perform at least the following:
receiving a location of the mobile device;
generating an index of a subset of points-of-interest in a geographical division associated with the location;
determining to cause storing of information about the index of the subset of points-of-interest based on the location, and respective actions, defined by a third party, that are performed by a mobile device employing a device behavior application when the mobile device is within a predetermined range of the respective points-of-interest wherein the generated index includes the subset of point-of-interest data and the respective actions; and
determining to cause transmission of the information to one or more of the mobile devices.

16. A method of claim 15, wherein the service is configured to further perform:
generating a control message for transmission to the one mobile device, wherein the control message indicates invoking one of the actions by the mobile device when within the predetermined range of a corresponding one of the points-of-interests.

17. A method of claim 16, wherein the information includes the index.

18. An apparatus comprising:
at least one processor; and
at least one memory including computer program code,
the at least one memory and the computer program code configured to, with the at least one processor, cause the apparatus to perform at least the following,
receive a location of a mobile device; and
generate an index of a subset of the points-of-interest in a geographical division associated with the location;
determine to store information about the index of the subset of points-of-interest based on the location, and respective actions, defined by a third party, that are performed by the mobile device employing a device behavior application when the mobile device is within a predetermined range of the respective points-of-interest, wherein the generated index includes the subset of point-of-interest data and the respective actions; and
determine to cause transmission of the information to one or more of the mobile devices.

19. An apparatus of claim 18, wherein the apparatus is further caused to:
generate a control message for transmission to the one mobile device, wherein the control message indicates invoking one of the actions by the mobile device when within the predetermined range of a corresponding one of the points-of-interests.

20. An apparatus of claim 18, wherein the information includes the index.

* * * * *